(12) United States Patent
Edman et al.

(10) Patent No.: US 11,882,453 B2
(45) Date of Patent: Jan. 23, 2024

(54) FRAUDELENT SUBSCRIPTION DETECTION

(71) Applicant: Telefonaktiebolaget LM Ericsson (publ), Stockholm (SE)

(72) Inventors: Christine Edman, Åkersberga (SE); Michael Liljenstam, Sunnyvale, CA (US); Vasileios Giannokostas, Stockholm (SE); András Méhes, Vaxholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 757 days.

(21) Appl. No.: 16/971,539

(22) PCT Filed: Nov. 20, 2018

(86) PCT No.: PCT/EP2018/081904
§ 371 (c)(1),
(2) Date: Aug. 20, 2020

(87) PCT Pub. No.: WO2019/161949
PCT Pub. Date: Aug. 29, 2019

(65) Prior Publication Data
US 2020/0396616 A1 Dec. 17, 2020

Related U.S. Application Data

(60) Provisional application No. 62/633,089, filed on Feb. 21, 2018.

(51) Int. Cl.
*H04W 12/121* (2021.01)
*G06N 20/00* (2019.01)
(Continued)

(52) U.S. Cl.
CPC .......... *H04W 12/121* (2021.01); *G06N 20/00* (2019.01); *G06Q 30/0185* (2013.01);
(Continued)

(58) Field of Classification Search
CPC ....... H04W 12/121; H04W 4/24; H04W 4/12; H04W 12/12; G06N 20/00;
(Continued)

(56) References Cited

U.S. PATENT DOCUMENTS

| 2008/0293409 | A1* | 11/2008 | Gillot | H04W 8/12 455/433 |
|---|---|---|---|---|
| 2009/0061860 | A1* | 3/2009 | Jiang | H04M 3/2281 455/433 |
| 2012/0072453 | A1* | 3/2012 | Guerra | G06F 21/32 707/E17.014 |

FOREIGN PATENT DOCUMENTS

| CN | 103609087 A | 2/2014 |
| CN | 103678659 A | 3/2014 |
| CN | 105661084 A | 6/2016 |

OTHER PUBLICATIONS

AlBougha, Mhd Redwan. "Comparing Data Mining Classification Algorithms in Detection of Simbox Fraud." St. Cloud State University, Dec. 2016. (Year: 2016).*

(Continued)

*Primary Examiner* — Darren B Schwartz
(74) *Attorney, Agent, or Firm* — Christopher & Weisberg, P.A.

(57) ABSTRACT

Arrangements are provided for identifying a second fraudulent subscription replacing a first fraudulent subscription. A method is performed by a fraudulent subscription detection system. The method includes obtaining notification of the first fraudulent subscription having been identified in a SIM box. The method comprises obtaining historical network data of the first fraudulent subscription. The method com includes prises generating a model based on the historical network data. The method includes identifying the second fraudulent subscription replacing the first fraudulent subscription in the SIM box upon providing live network data (Continued)

as input to the model. The method includes providing an identification of the second fraudulent subscription to at least one of a subscription manager entity and a user interface of a Manual Analysis component.

16 Claims, 9 Drawing Sheets

(51) Int. Cl.
| | | |
|---|---|---|
| *G06Q 30/018* | (2023.01) | |
| *G06Q 30/0204* | (2023.01) | |
| *H04L 41/14* | (2022.01) | |
| *H04M 15/00* | (2006.01) | |
| *H04M 17/00* | (2006.01) | |
| *H04W 4/24* | (2018.01) | |
| *H04W 4/12* | (2009.01) | |
| *H04L 12/14* | (2006.01) | |
| *H04L 9/40* | (2022.01) | |
| *H04W 12/12* | (2021.01) | |

(52) U.S. Cl.
CPC ....... *G06Q 30/0205* (2013.01); *H04L 41/145* (2013.01); *H04M 15/47* (2013.01); *H04M 17/103* (2013.01); *H04W 4/24* (2013.01)

(58) Field of Classification Search
CPC ............ G06Q 30/0185; G06Q 30/0205; H04L 41/145; H04L 12/14; H04L 63/1466; H04L 63/1408; H04M 15/47; H04M 17/103; H04M 17/10; H04M 15/00
See application file for complete search history.

(56) References Cited

OTHER PUBLICATIONS

K.G.D.C. Kehelwala, et al. "Real-Time Grey Call Detection System Using Complex Event Processing," in Proc. 22nd Annual Conf. of IET Sri Lanka Network, Sri Lanka, Sep. 2015. (Year: 2015).*
A. J. Kouam, et al. "SIMBox Bypass Frauds in Cellular Networks: Strategies, Evolution, Detection, and Future Directions," in IEEE Communications Surveys & Tutorials, vol. 23, No. 4, pp. 2295-2323, Fourthquarter 2021. (Year: 2021).*
International Search Report dated Jun. 3, 2019 for International Application PCT/EP2018/081904 filed on Nov. 20, 2018, consisting of 10-pages.
Murynets Ilona et al: Analysis and Detection of SIMbox Fraud in Mobility Networks; IEEE Conference on Computer Communications, Apr. 27, 2014, pp. 1519-1526; consisting of 8-pages.
Roselina Sallehuddin et al; Detecting SIMbox Fraud by Using Support Vector Machine and Artificial Neural Network; Jurnal Teknologi; Apr. 28, 2015; vol. 74 No. 1; consisting of 13-pages.
Chinese Office Action with English Summary Translation dated May 6, 2022 for Patent Application No. 201880092522.5, consisting of 18-pages.

* cited by examiner

FRAUDELENT SUBSCRIPTION DETECTION

CROSS-REFERENCE TO RELATED APPLICATIONS

This application is a Submission Under 35 U.S.C. § 371 for U.S. National Stage Patent Application of International Application No.: PCT/EP2018/081904, filed Nov. 20, 2018 entitled "FRAUDELENT SUBSCRIPTION DETECTION," which claims priority to U.S. Provisional Application No. 62/633,089, filed Feb. 21, 2018, the entireties of both of which are incorporated herein by reference.

TECHNICAL FIELD

Embodiments presented herein relate to a method, a fraudulent subscription detection system, a computer program, and a computer program product for identifying a second fraudulent subscription replacing a first fraudulent subscription.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to detect and mitigate so-called "bypass fraud".

For mobile network operators, so-called "bypass fraud" is one of the most expensive types of fraud, and SIM-box fraud, in turn, is the prime representative of "bypass fraud". In this respect, a SIM-box (also called a SIM bank, where SIM is short for subscriber identity module or subscriber identification module) is a device that might be used as part of a Voice over Internet Protocol (VoIP) gateway installation, or other gateway installation. It contains a number of SIM cards, which are linked to the network gateway but housed and stored separately from it. A SIM-box can have SIM cards of different mobile operators installed, permitting it to operate with several network gateways located in different physical locations. A Fraudulent International Carrier can route international calls through the VoIP connection and the SIM-box operator connects the call as local traffic, allowing the Fraudulent International Carrier to, with the help of the SIM-box's operator, bypass international rates and often undercut prices charged by local mobile network operators.

Figure 1:
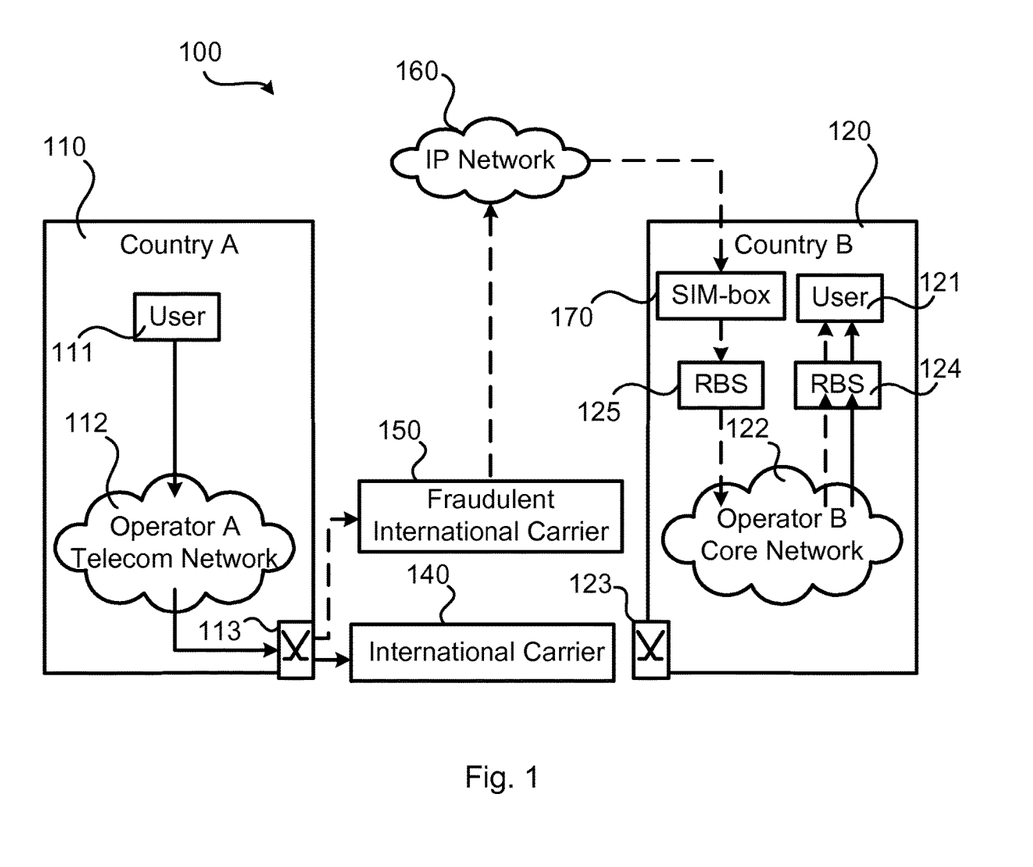
FIG. 1 is a schematic diagram illustrating a communications system according to embodiments.

FIG. 1 is a schematic diagram of a communications system 100 and illustrates a common scenario for SIM-box fraud of international calls. The usual route of an international call is indicated by continuous arrows. A participant 111 served by a mobile network operator A in country A 110 initiates a call, which first passes a local telecommunications network 112, and then an international exchange 113, which allows connecting to an international carrier 140. On its way to the destination in country B 120, the call may be routed through several international carriers, passing through different international exchanges, until it arrives to the termination international exchange 123, where the call enters the recipient local telecommunications network 122, and accounting is performed for termination fees. The call is finally delivered to the recipient 121 via a Radio Base Station (RBS) 124.

As an example, the fraudulent bypass under consideration could have its point of origin at the first international exchange 123, where an international carrier is first chosen when leaving the serving mobile network operator's telecommunications network 112. In general terms, the fraudulent path my diverge from the legitimate path at any exchange along the way towards the first international exchange 123. Due to simple economics, it is common to employ so-called least cost routing to select a carrier for a call in a dynamic market place of international carriers, where a fraudulent international carrier 150 can influence the selection by offering to carry the call for a lower price than its competitors. They can afford to do so, since, unlike a law-abiding international carrier 140, a fraudulent international carrier 150 does not pass the call through the appropriate terminating international exchange 123. Instead the call is routed via IP network 160 to a SIM-box 170, which transmits the call as a local call via an RBS 125 and the associated local telecommunications network 122 of the mobile network operator B in country B, towards the recipient 121. For SIM-box terminated calls, the recipient 121 may be a subscriber in the local telecommunications network 122 (so-called on-net), in another local telecommunications network, or even in a fixed telecommunications network, or, potentially, in another (usually nearby) country (off-net). The call only passes through the RBS 124 in the first (on-net) case. In all other (off-net) cases, the call leaves the local telecommunications network 122 for further delivery to the recipient 121. In either case, the call is not levied the correct termination fee to mobile network operator B. And, in the off-net case, mobile network operator B may incur additional charges when forwarding the call.

The significant revenue loss for mobile network operators faced with SIM-box fraud serves as a motivation for SIM-box detection techniques. A number of SIM-box detection systems that enable mobile network operators to block subscriptions used for SIM-box fraud have been proposed.

Figure 2:
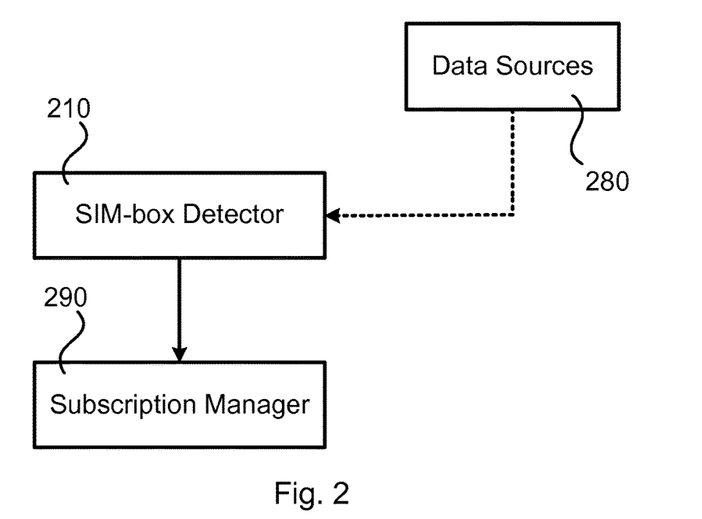
FIG. 2 schematically illustrates an existing SIM-box detection system.

The general architecture of such existing SIM-box detection systems is illustrated in FIG. 2. A SIM-box detector 210, that optionally uses input from external data sources 280, informs a subscription manager entity 290, or a human analyst, about potential SIM-box subscriptions. There could be different kinds, or types, of data sources 280, such as Call Detail Records (CDR), Customer Relationship Management (CRM) data, or other sources of data. Such other sources of data might comprise auxiliary data, such as included in node events, collected from the mobile Radio Access Network (RAN) or mobile core network (CN) elements.

A first example of a SIM-box detector 210 is a Test Call Generator Service, which initiates test calls, and does not rely on any external data sources. Usually, these test calls are placed by said service from multiple different countries and targeted to a monitored number pool in the customer's network. The Test Call Generator Service keeps track of call characteristics like the expected and actual call origin and call destination, which allow them to identify calls placed via subscriptions used for SIM-box fraud.

A second example of a SIM-box detector 210 is a traditional Fraud Management System (FMS). A FMS commonly applies a number of pre-defined rules on its inputs from several data sources to identify subscriptions used for SIM-box fraud. This automated rule-based approach can lead to a high rate of false alarms, i.e. a large number of subscriptions wrongly flagged as being used for SIM-box fraud, necessitating further manual analysis. An FMS thus needs to be regularly adjusted to reduce false alarms.

A third example of a SIM-box detector 210 applies Machine Learning (ML) algorithms to identify subscriptions used for SIM-box fraud. This can be considered as an evolution of a traditional FMS. This variant utilizes relevant information from its data sources, and applies ML algorithms to detect subscriptions used for SIM-box fraud.

For different reasons, the existing SIM-box detection approaches described above share a common characteristic; the detection time of new SIM-box subscriptions averages on the order of several days. Considering that the initial balance on prepaid SIM cards commonly used for SIM-box fraud is usually low and that SIM-box operators, to avoid getting traced, do not top-up but replace the SIM cards in their SIM-boxes as soon as the initial balance is used up (or the subscription is detected and terminated), the expected lifetime of a SIM-box subscription under regular calling patterns is commonly less than a week. Consequently, a significant portion of SIM-box subscriptions is never detected (or detected too late), rendering the effectiveness of these existing SIM-box detection approaches for countering revenue leaks less than optimal.

One reason the Test Call Generator Service approach can suffer days of delay in detection (on average) is that the majority of the test calls takes the legitimate route in FIG. 1 and only a small fraction results in detected SIM-box subscriptions, making this approach too costly for continuous detection. This leads to patterns of short test call campaigns with a large number of detections interspersed with longer period of unabated SIM-box use.

As for the FMS 260 and ML 270 approaches, one reason behind the slow detection is the time it takes to gather sufficient evidence for the rules and features to distinguish the behavior of "normal" subscriptions from those of SIM-box subscriptions. Depending on the false positive rate, the need for manual analysis can introduce additional delay.

Hence, there is still a need for improved mechanisms for identifying fraudulent subscriptions.

SUMMARY

An object of embodiments herein is to provide efficient mechanisms for identifying fraudulent subscriptions that do not suffer from the issues noted above, or at least where the effects of these issues are reduced or mitigated.

According to a first aspect there is presented method for identifying a second fraudulent subscription replacing a first fraudulent subscription. The method is performed by a fraudulent subscription detection system. The method comprises obtaining notification of the first fraudulent subscription having been identified in a SIM box. The method comprises obtaining historical network data of the first fraudulent subscription. The method comprises generating a model based on the historical network data. The method comprises identifying the second fraudulent subscription replacing the first fraudulent subscription in the SIM box upon providing live network data as input to the model. The method comprises providing an identification of the second fraudulent subscription to at least one of a subscription manager entity and a user interface entity.

According to a second aspect there is presented a fraudulent subscription detection system for identifying a second fraudulent subscription replacing a first fraudulent subscription. The fraudulent subscription detection system comprises processing circuitry. The processing circuitry is configured to cause the fraudulent subscription detection system to obtain notification of the first fraudulent subscription having been identified in a SIM box. The processing circuitry is configured to cause the fraudulent subscription detection system to obtain historical network data of the first fraudulent subscription. The processing circuitry is configured to cause the fraudulent subscription detection system to generate a model based on the historical network data. The processing circuitry is configured to cause the fraudulent subscription detection system to identify the second fraudulent subscription replacing the first fraudulent subscription in the SIM box upon providing live network data as input to the model. The processing circuitry is configured to cause the fraudulent subscription detection system to provide an identification of the second fraudulent subscription to at least one of a subscription manager entity and a user interface entity.

According to a third aspect there is presented a fraudulent subscription detection system for identifying a second fraudulent subscription replacing a first fraudulent subscription. The fraudulent subscription detection system comprises an obtain module configured to obtain notification of the first fraudulent subscription having been identified in a SIM box. The fraudulent subscription detection system comprises an obtain module configured to obtain historical network data of the first fraudulent subscription. The fraudulent subscription detection system comprises a generate module configured to generate a model based on the historical network data. The fraudulent subscription detection system comprises an identify module configured to identify the second fraudulent subscription replacing the first fraudulent subscription in the SIM box upon providing live network data as input to the model. The fraudulent subscription detection system comprises a provide module configured to provide an identification of the second fraudulent subscription to at least one of a subscription manager entity and a user interface entity.

Advantageously this provides efficient identification of fraudulent subscriptions.

Advantageously the disclosed method and fraudulent subscription detection system do not suffer from the issues noted above.

Advantageously, by focusing on the exact behavior of specific SIM-boxes (as implied by a freshly detected SIM-box subscription) the disclosed method and fraudulent subscription detection system significantly reduce the detection time for replacement SIM-box subscriptions.

Advantageously the disclosed method and fraudulent subscription detection system yield an improved detection speed in the order of hours instead of days as for existing SIM-box detection approaches.

Advantageously, as a result of the fast detection, prepaid subscriptions used in SIM-boxes can be terminated before their initial balance is used up, resulting in increased costs for fraudsters, and, by extension, decreased revenue loss for mobile network operators.

Advantageously, by tuning the model to the observed behavior of a specific identified SIM-box based on specific characteristics for the detected SIM-box subscription the disclosed method and fraudulent subscription detection system are more accurate than existing SIM-box detection approaches.

Advantageously the disclosed method and fraudulent subscription detection system can be deployed in conjunction with any of the above disclosed existing detection systems with no or minimal modifications, building on the established methods for detecting original SIM-box subscriptions and applying the disclosed method and fraudulent subscription detection system to detect replacement subscriptions.

According to a fourth aspect there is presented a computer program for identifying a second fraudulent subscription replacing a first fraudulent subscription, the computer program comprising computer program code which, when run on a fraudulent subscription detection system, causes the fraudulent subscription detection system to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Examples of existing SIM-box detection approaches and their related issues have been disclosed above.

The embodiments disclosed herein therefore relate to mechanisms for identifying a second fraudulent subscription replacing a first fraudulent subscription. In this respect, a fraudulent subscription could be interpreted as a subscription used for SIM box fraud. In order to obtain such mechanisms there is provided a fraudulent subscription detection system 220, a method performed by the fraudulent subscription detection system 220, a computer program product comprising code, for example in the form of a computer program, that when run on a fraudulent subscription detection system 220, causes the fraudulent subscription detection system 220 to perform the method.

Figure 3:
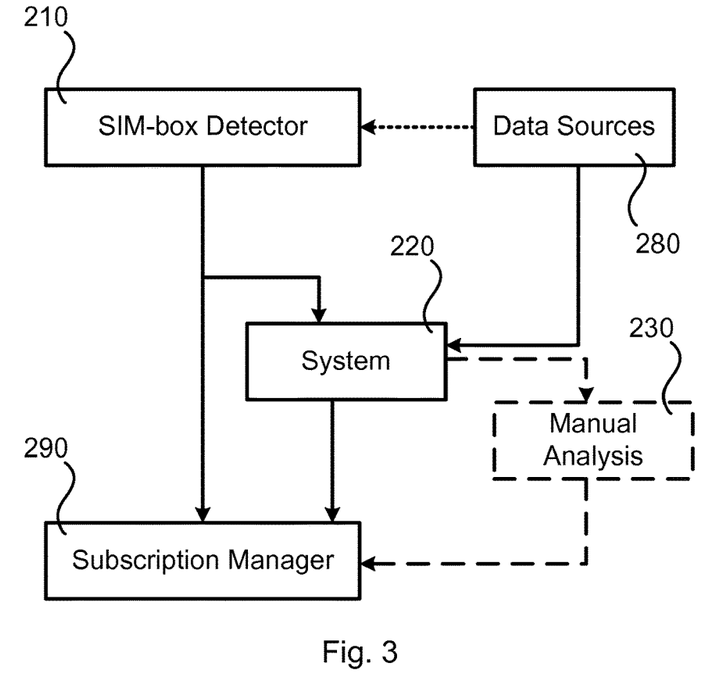
FIG. 3 schematically illustrates a fraudulent subscription detection system in mirror mode according to an embodiment.
Figure 4:
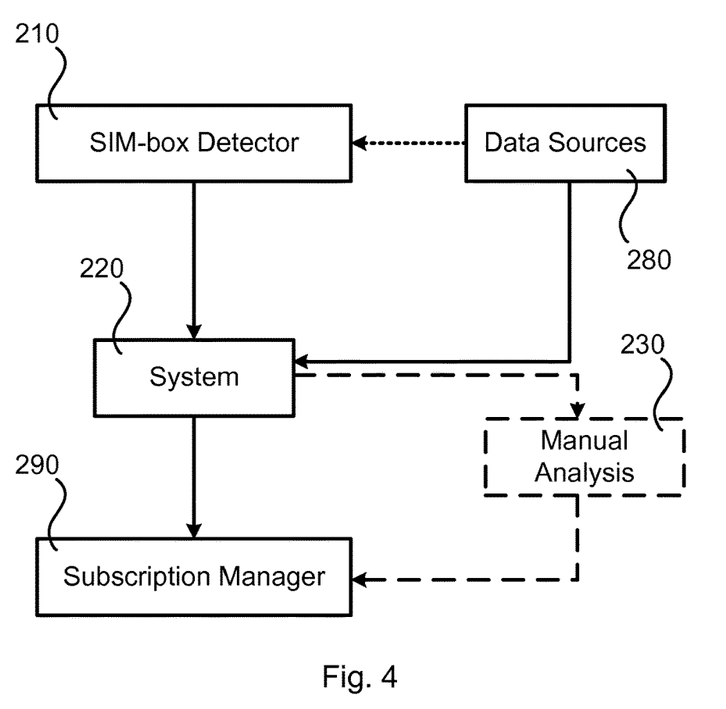
FIG. 4 schematically illustrates a fraudulent subscription detection system in inline mode according to an embodiment.

FIGS. 3 and 4 illustrate how the herein disclosed fraudulent subscription detection system 220 could be provided in an existing SIM-box detection systems, such as the existing SIM-box detection system illustrated in FIG. 2. FIG. 3 gives an example of an embodiment using mirror mode. FIG. 4 gives an example of an embodiment using inline mode.

In mirror mode, notifications for each identified SIM-box subscription are passed directly from the SIM-box Detector 210 to the Subscription Manager 290 as before, and at the same time these messages are also mirrored to the herein disclosed fraudulent subscription detection system 220. This embodiment leaves the pre-existing detection system largely unaffected, allowing immediate termination of SIM-box subscriptions identified both by the original SIM-box Detector 210, exactly as before, and by the herein disclosed fraudulent subscription detection system 220.

In inline mode, the herein disclosed fraudulent subscription detection system 220 is provided interposed between the SIM-box Detector 210 and the Subscription Manager 290, and might therefore be configured to actively forward notifications from the SIM-box Detector 210 to the Subscription Manager 290, possibly, and, in some cases, advantageously, incurring additional delay. This delay may be useful to ensure that the replacement detector for the freshly identified SIM-box subscription is operational before the freshly identified SIM-box subscription is terminated.

As will be further disclosed below, in both mirror mode and inline mode, the fraudulent subscription detection system 220 receives notifications of identified SIM-box subscriptions from the SIM-box Detector 210 and data relevant to behavioral modeling and detection from various Data Sources 280. As will be further disclosed below, an optional Manual Analysis component 230 might be utilized to pass suspected replacement subscriptions, with substantial but not quite conclusive evidence, to a human expert for further analysis.

Figure 5:
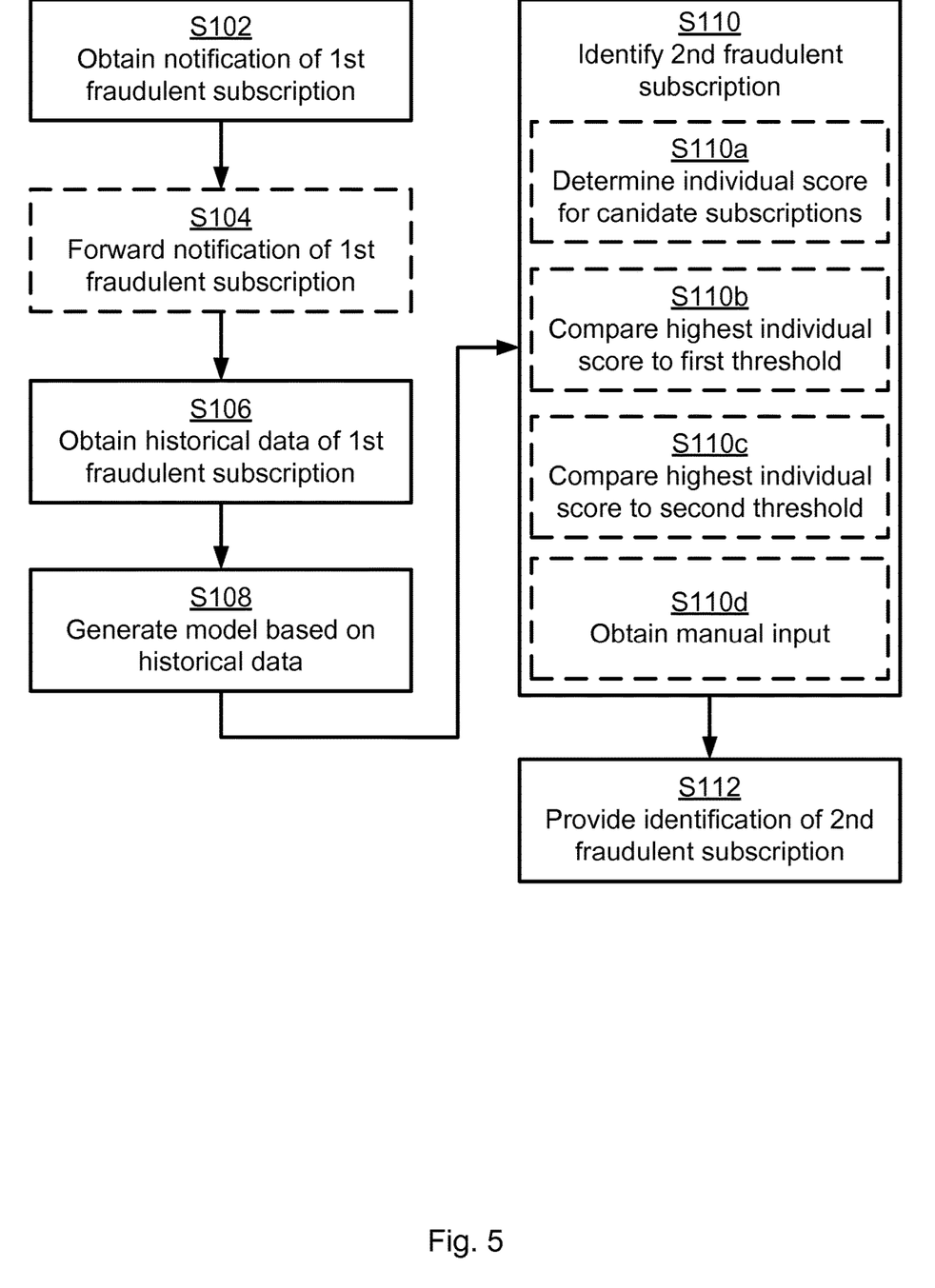
FIGS. 5, 7, 8, and 9 are flowcharts of methods according to embodiments.

FIG. 5 is a flowchart illustrating embodiments of methods for identifying a second fraudulent subscription replacing a first fraudulent subscription. The methods are performed by the fraudulent subscription detection system 220. This system 220 could be regarded as a SIM box subscription replacement detection system. The methods are advantageously provided as computer programs 1320.

The herein disclosed embodiments aim towards quickly detecting replacement SIM-box subscriptions, in other words, subscriptions that replace recently detected subscriptions used for SIM-box fraud. Hence, the fraudulent subscription detection system 220 is configured to perform step S102:

S102: The fraudulent subscription detection system 220 obtains a notification of the first fraudulent subscription having been identified in a SIM box 170.

The fraudulent subscription detection system 220 collects data associated with the freshly detected SIM-box subscription (i.e., the first fraudulent subscription). Particularly, the fraudulent subscription detection system 220 is configured to perform step S106:

S106: The fraudulent subscription detection system 220 obtains historical network data of the first fraudulent subscription.

The fraudulent subscription detection system 220 then analyzes the recent behavior of this SIM-box subscription, and based on this analysis, identifies possible replacements of this freshly detected SIM-box subscription. The recent behavior is analyzed using a model. Particularly, the fraudulent subscription detection system 220 is configured to perform step S108:

S108: The fraudulent subscription detection system 220 generates a model based on the historical network data.

A separate model tailored to each freshly detected SIM-box subscription is thus built. The model is thus built to characterize the behavior of the freshly detected SIM-box subscription. In general terms, the model is built to identify those components in the input network data (both historical and live) that best distinguish the targeted behavior (i.e. input network data having characteristics of a fraudulent subscription) from the rest. The thus built model is then fed live network data in order to detect a new fraudulent subscription replacing the freshly detected SIM-box subscription. Hence, the fraudulent subscription detection system 220 is configured to perform step S110:

S110: The fraudulent subscription detection system 220 identifies the second fraudulent subscription replacing the first fraudulent subscription in the SIM box 170 upon providing live network data as input to the model.

The characteristics of the freshly detected SIM-box subscription are captured by the model. Therefore, feeding live network data to the model enables any subscription for which the live network data has characteristics similar to those of the freshly detected SIM-box subscription (i.e., having a behavior similar or even identical to that described by the model) to be identified as a replacement fraudulent subscription.

Once the replacement fraudulent subscription (i.e., the second fraudulent subscription) has been detected, a notification thereof is provided. Particularly, the fraudulent subscription detection system 220 is configured to perform step S112:

S112: The fraudulent subscription detection system 220 provides an identification of the second fraudulent subscription to at least one of a subscription manager entity 290 and a user interface of a Manual Analysis component 230.

That is, the identification is provided either to only the subscription manager entity 290, or to only the user interface of the Manual Analysis component 230, or to both the subscription manager entity 290 and the user interface of the Manual Analysis component 230.

Figure 6:
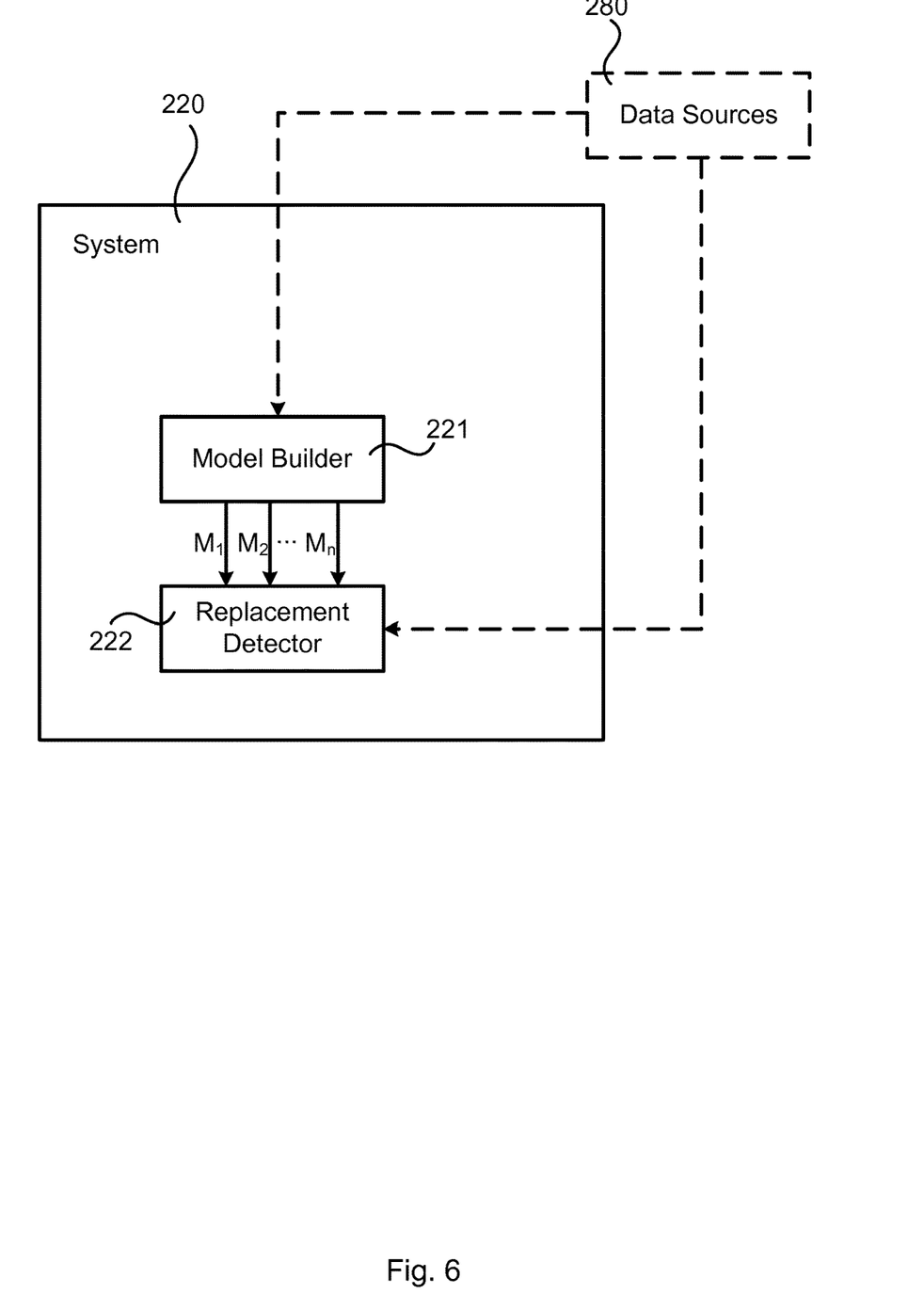
FIG. 6 is a block diagram of a fraudulent subscription detection system according to an embodiment.

Parallel reference is now made to FIG. 6. FIG. 6 schematically illustrates a block diagram of the fraudulent subscription detection system 220. As shown in FIG. 6, the fraudulent subscription detection system 220 comprises a Model Builder 221 and a Replacement Detector 222. For each SIM-box subscription freshly identified by a pre-existing SIM-box detector 210 and obtained by the fraudulent subscription detection system 220 (as in step S102), the Model Builder 221 retrieves recent historical data (as in step S106) from the relevant Data Sources 280, builds a model (as in step S108) specifically for that subscription, and deploys the model to the Replacement Detector 222. The latter feeds live behavioral data (as in step S110) from the same Data Sources 280 to each deployed model to detect replacement SIM-box subscriptions and provides a notification once a replacement SIM-box subscription has been detected (step S112). In this respect, the speed advantage of the replacement detector 222 compared to a generic SIM-box detector 210 derives from the replacement detector 222 analyzing the specific characteristics of a single freshly detected SIM-box subscription in the SIM-box 170 as opposed to a generic model of "total" SIM-box behavior as used in existing generic SIM-box detectors 210.

Embodiments relating to further details of identifying a second fraudulent subscription replacing a first fraudulent subscription as performed by the fraudulent subscription detection system 220 will now be disclosed.

There could be different ways for the fraudulent subscription detection system 220 to obtain the notification in step S102 of the first fraudulent subscription having been identified in a SIM box 170. As in the illustrative example of FIG. 4, according to an embodiment the notification is obtained from a SIM box detector 210. For finding the original subscriptions used for SIM-box fraud, any pre-existing generic SIM-box detection alternative (as, for example, one of those described above) may be used. Hence, according to an embodiment the SIM box detector 210 utilizes at least one of a test call generator service, a fraud management system, and an ML algorithm to identify the first fraudulent subscription. In this respect, test call generator services might be preferred when the risk of having false positives is to be minimized.

As disclosed above, the fraudulent subscription detection system 220 could operate in either mirror mode or in inline mode. When operating in inline mode the fraudulent subscription detection system 220 might actively forward the notification obtained in step S102 to the subscription manager entity 290. Hence, according to an embodiment the fraudulent subscription detection system 220 is configured to perform (optional) step S104:

S104: The fraudulent subscription detection system 220 forwards the notification of the first fraudulent subscription to the subscription manager entity 290.

Figure 8:
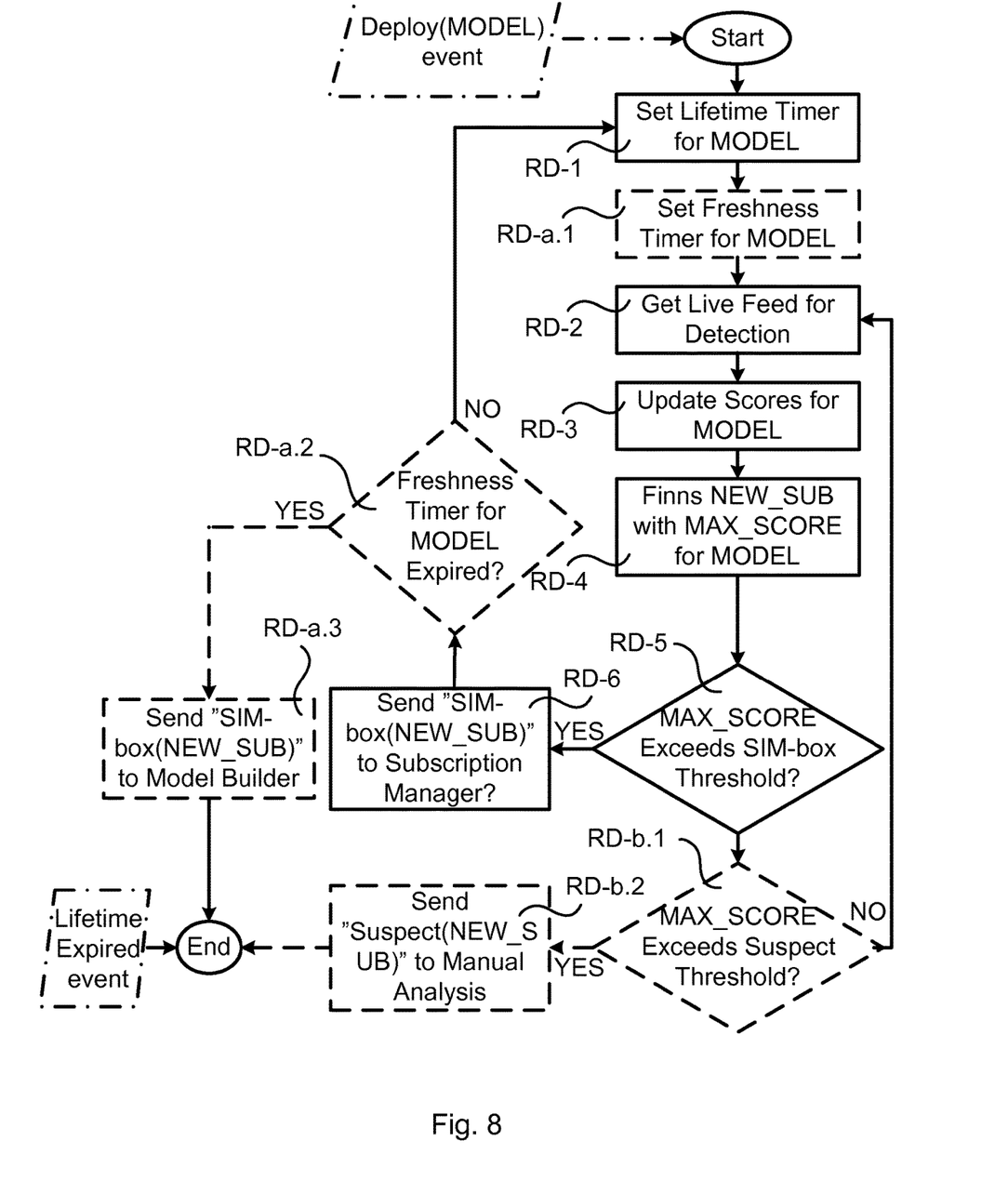
Figure 9:
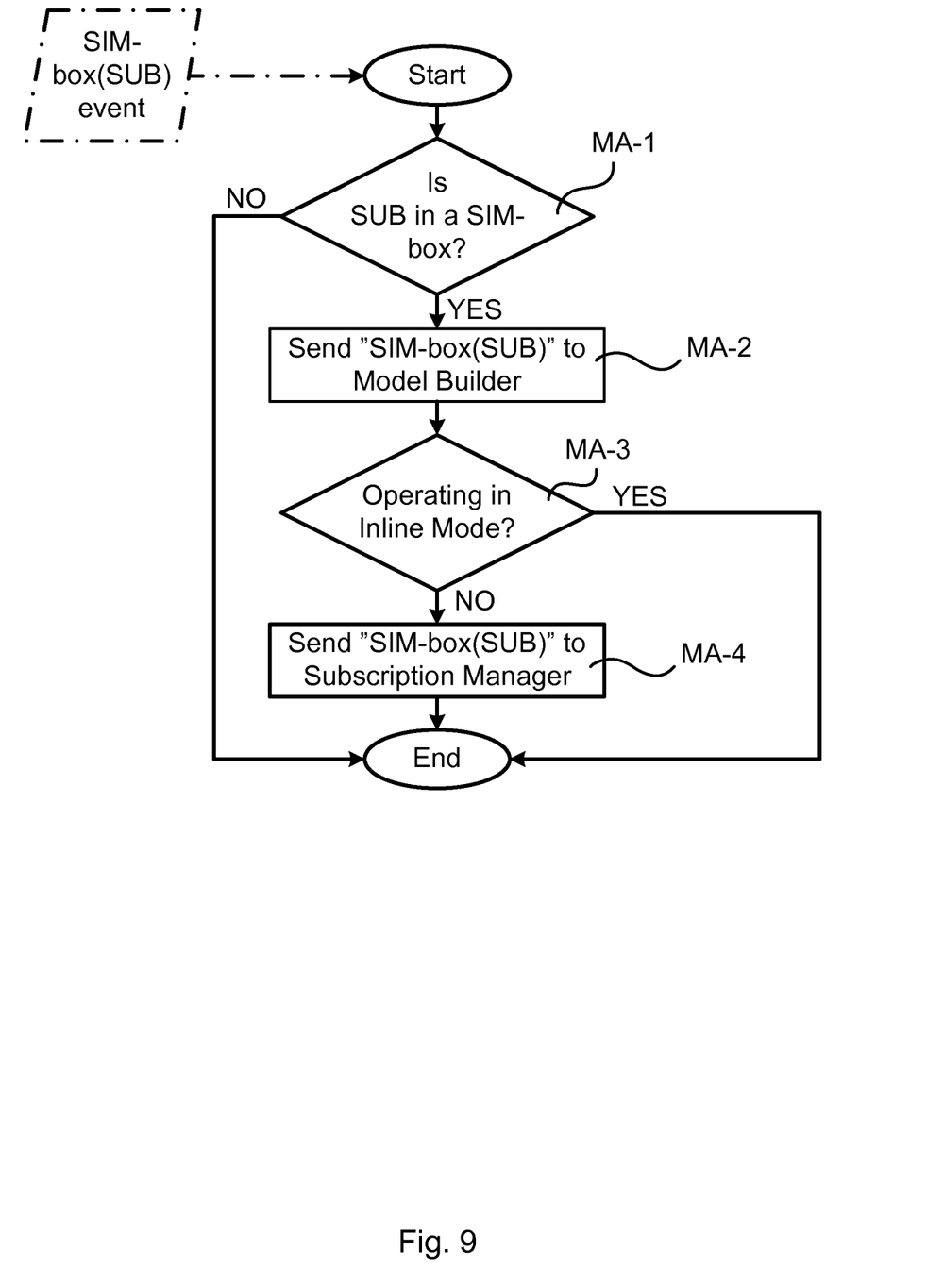

Continued reference is made to FIGS. 5 and 6. Parallel reference will be made to the flowchart of FIGS. 7, 8, and 9. Steps in the flowcharts of FIGS. 7, 8, and 9 are marked XY-n for easy reference, where XY are the initials of the component performing a step and n is the numeral for the step, or, in case of steps only performed in optional variants, a letter denoting the variant followed by a dot and the numeral.

Figure 7:
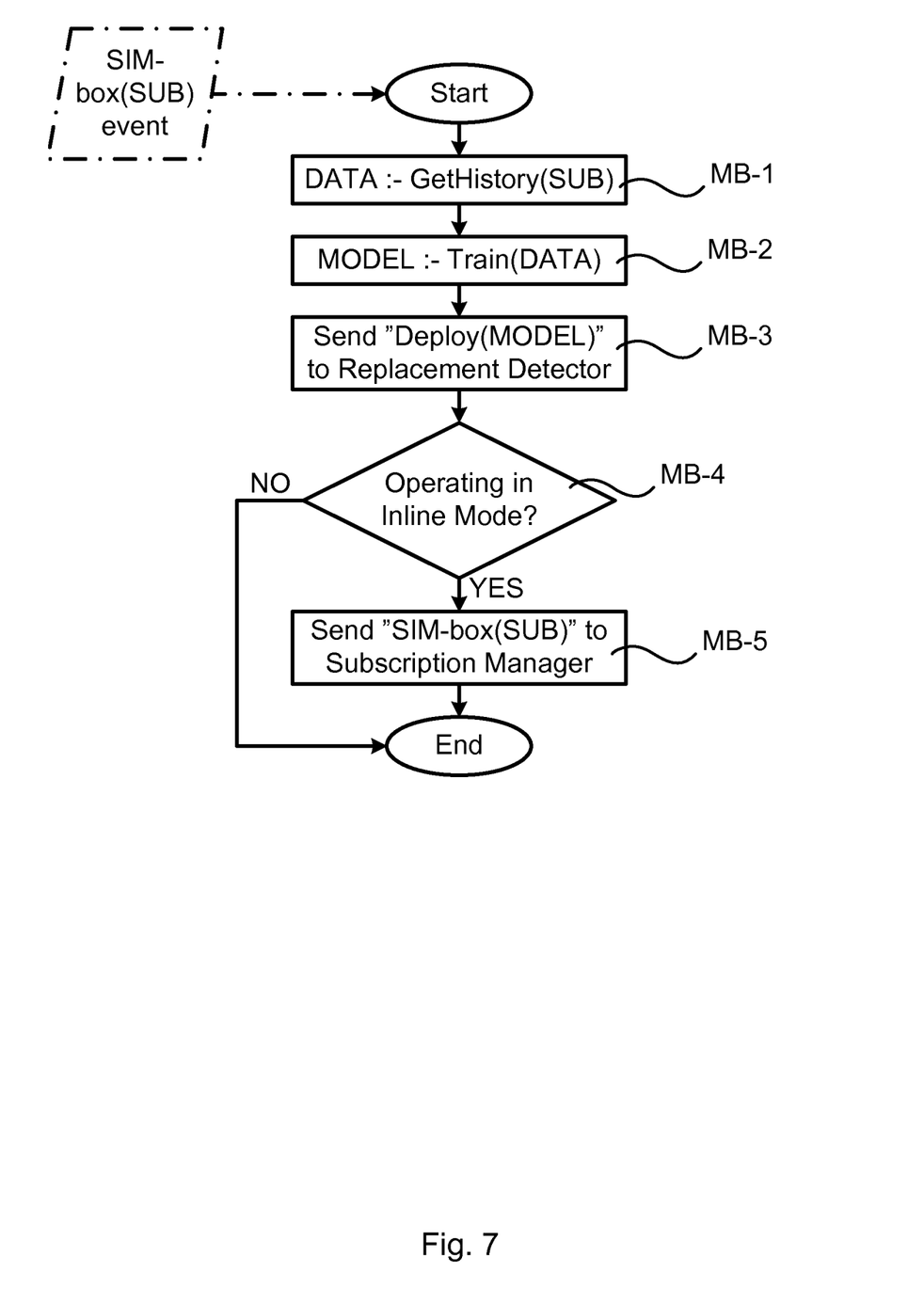

Further aspects of the Model Builder 221 will now be disclosed with parallel reference to the flowchart in FIG. 7. As depicted in the flowchart of FIG. 7, the start of a new Model Builder instance is triggered by a SIM-box(SUB) event.

This event signifies a freshly detected SIM-box subscription SUB and could be generated by a pre-existing SIM-box Detector 210, the Replacement Detector 222, or the Manual Analysis component 230.

Each Model Builder instance first retrieves recent historical data for the subscription SUB it is responsible for (i.e. the one whose detection triggered its execution) from the Data Sources 280 in step MB-1. Next, it trains a model based on the retrieved DATA in step MB-2, and sends the resulting MODEL to the Replacement Detector 222 encapsulated in a Deploy(MODEL) event in step MB-3. Then, the Model Builder 221 checks its configuration in step MB-4 to determine if the fraudulent subscription detection system 220 operates in inline mode; and, if so, also forwards its triggering SIM-box(SUB) event to the Subscription Manager 290 in step MB-5. Finally, the instance terminates.

If additional SIM-box(SUB) events are received during the execution of some Model Builder 221 instance(s), new instances are started, resulting in multiple Model Builder 221 instances running independently and in parallel, each instance dedicated to handling its own subscription.

As an alternative to querying the Data Sources 280 for recent data, the Data Sources 280 could instead constantly send data to the Model Builder 221, which would maintain a collection of recent data while discarding the rest. Thus, when the Model Builder instance is triggered it can then simply process the stored data.

One purpose of the historical network data (defining the above retrieved DATA) is to generate a model based on characteristics of the first fraudulent subscription. There could be different types of such characteristics. In some aspects the characteristics pertain to at least one of mobile equipment identifier (such as International Mobile Equipment Identity (IMEI), subscription identifier (such as International Mobile Subscriber Identity (IMSI) or Mobile Station International Subscriber Directory Number (MSISDN)), geographical location, and/or calling pattern of the first fraudulent subscription. The model is thereby tuned to the observed behavior of a specific identified SIM-box based on specific characteristics for the detected SIM-box and is therefore more accurate than the pre-existing generic systems described above.

The models built by the Model Builder 221 based on the labeled historical network data for the particular freshly identified SIM-box subscription are used in the Replacement Detector 222 to make predictions for subscriptions based on the live network data.

There could be different types of historical network data. For example, the historical network data might represent at least one of a call detail record, a customer relationship management record, and mobile network data (such as node event data or packet captures) of the first fraudulent subscription. In this respect, due to lifecycle patterns, only historical network data being a few hours (such as 6, 8, or 12 hours) or a few days old (such as less than a week old) might be considered.

There could be different types of live network data. Assuming that a set of subscriptions are generated by the fraudulent subscription detection system 220, the live network data might, for example, represent at least one of a call detail record, a customer relationship management record, and mobile network data (such as node event data or packet captures) of the subscriptions. Alternatively or additionally, the live network data might comprise initial signalling for setting up a new subscription.

Either the same type or the different type of data is used in the historical network data and the live network data.

According to an embodiment, identifying the second fraudulent subscription involves comparing feature vectors of any subscriptions generated from the live network data with a feature vector built from the historical network data for the first fraudulent subscription. A feature in the feature vector is, in general, a description (e.g. as count, percent, Vo-value, or average value) of an attribute for subscriptions, where the concrete numbers are extracted from the network data. Identifying the second fraudulent subscription might then involve classifying, according to the comparing, each of the subscriptions as either legitimate or fraudulent.

Of special interest for SIM-box fraud detection are those features of the live network data that can be expected to differ between SIM-box and non-SIM-box subscriptions. E.g. a feature defined by the average percentage of outgoing night calls can be extracted from outgoing call records with timestamps allocated during a time period of at least one day. Individual features are engineered by collecting training network data derived from the Data Sources 280, where the collection of features for a particular subscription forms the feature vector of the subscription. Examples of features for SIM-box fraud detection, derived from call detail record fields, are average call duration of outgoing calls, number of locations, number of outgoing calls, number of ingoing calls, number of IMSIs operated per IMEI, and ratio of the number of destinations to the total number of calls.

For both the historical network data and the live network data one and the same extractor for feature vectors might be used. The feature vectors are fed to the Model Builder 221 and the Replacement Detector 222, respectively.

Before applying an algorithm to build and train the model the subscriptions in the historical network data are labeled either with class labels (e.g. "positive" or "1" for freshly identified SIM-box and "negative" or "0" for legitimate subscriptions) in case of classification algorithms, or with probabilities 1 and 0, respectively, in case of regression algorithms.

Alternatively, models could also be built by e.g. extracting the set of all mobile equipment identifiers for the target SIM-box 170, computing the average hourly rate (i.e. number of outgoing calls per hour) for target SIM-box 170 and designing some ad hoc rule for weighting matches and distance from average hourly rate.

There could be different types of models. Some non-limiting examples of models that could be used are ML models, statistical models, and rule-based models.

Predictions derived from ML algorithms such as Random Forest, Neural Networks, Linear Regression or Gradient-Boosted Trees are based on the particular internal procedure and are either 1/o-predictions (for hard predictions from classification algorithms) or score values (between o and 1 for regression algorithms or soft predictions from classification algorithms). As an example, according to a naive ad hoc model, scores can be based on matches and distance from average hourly rate for updated subscriptions' count of outgoing calls per hour. The models are used to score all subscriptions continually based on their features extracted from the live network data.

Further aspects of the Replacement Detector 222 will now be disclosed with parallel reference to the flowchart in FIG. 8. As shown in the flowchart of FIG. 8, the start of a new Replacement Detector instance is triggered by a Deploy (MODEL) event received from the Model Builder component 221. Each instance makes use of a Lifetime Timer (defining a first timer) and an optional Freshness Timer (defining a second timer), which are set in steps RD-1 and RD-a.i, respectively.

The initial value of the Lifetime Timer indicates how long a particular detector instance is allowed to operate without detecting a new replacement subscription. Typically, this value may be on the order of a few days. The expiry of the Lifetime Timer generates an asynchronous Lifetime Expired event, which causes the instance to terminate. Thus, according to an embodiment the first timer is started upon obtaining the notification (in step S102), and the second fraudulent subscription is identified (in step S110) before expiration of the first timer. Likewise, if the first timer expires, the detection is aborted, hence resulting in that the second fraudulent subscription fails to be identified. Handling of the Freshness Timer is synchronous and will be explained in the relevant steps below.

Steps RD-2, RD-3, RD-4, and RD-5 (and, optionally, step RD-b.1, if Manual Analysis is also used) constitute the Replacement Detector's 222 main detection loop, which is repeated until either a relevant subscription is found or the instance gets terminated. Live data from the relevant Data Sources 280 is retrieved in step RD-2. The live data is fed to the model to generate scores for each subscription in step RD-3. The highest scoring subscription NEW_SUB along with the corresponding maximum score MAX_SCORE is found in step RD-4. These steps need not be implemented in a strictly serial fashion. In fact, a person skilled in the art will identify several optimized alternatives, including, without limitation, interleaved and/or parallel approaches.

Based on the fed live data the model generates "soft predictions", i.e. scores, for all subscriptions continually as it processes the incoming live data (as in step RD-3). Hence, according to an embodiment the fraudulent subscription detection system 220 is configured to perform (optional) steps S110a, S110b as part of identifying the second fraudulent subscription in step S110:

S110a: The fraudulent subscription detection system 220 determines an individual score for each subscription generated from the live network data. The score relates to each subscription being a fraudulent subscription.

S110b: The fraudulent subscription detection system 220 compares the highest individual score to the first threshold.

In some aspects, only a set of candidate subscriptions are generated by the model, and the individual score thus only is determined for each of these candidate subscriptions.

Subscriptions for which the scores (or, for simplicity, the highest score) that exceed the first threshold are then considered to be fraudulent (as in step RD-4). That is, according to an embodiment the second fraudulent subscription is the subscription having highest score, where the highest score is above the first threshold.

At the end of each main loop iteration (i.e. on occurrence of each of steps RD-2 to RD-5), the Replacement Detector 222 compares MAX_SCORE to its pre-configured SIM-box Threshold (defining the first threshold) in step RD-5. This threshold controls how much evidence, i.e. how high a score, is required for automated action. This threshold could be adjusted similarly to the analogous settings for the traditional FMS or ML approaches to minimize the false positive rate. If the SIM-box Threshold is exceeded, NEW_SUB is reported as defining a replacement subscription to the Subscription Manager 290 via a SIM-box (NEW_SUB) event in step RD-6, and the detection process is restarted at step RD-1, unless the optional Freshness Timer is in use.

Particularly, according to an embodiment the second timer is started upon obtaining the notification (as in step S102). When the second fraudulent subscription is identified before expiration of the second timer, the model is kept for identifying a third fraudulent subscription replacing the second fraudulent subscription. Alternatively, when the second fraudulent subscription is not identified before expiration of the second timer, a new model is generated for identifying a third fraudulent subscription replacing the second fraudulent subscription.

One rationale for the freshness check implemented by the Freshness Timer in step RD-a.2 is that slower detection, e.g. longer than, say half a day or a full day, may depend on the behavior of the replacement subscription having diverged considerably from that of the original SIM-box subscription. In that case, abandoning the current model and training a new model based on the changed behavior may result in better accuracy and faster detection. Thus, when the Freshness Timer is exceeded, the SIM-box(NEW_SUB) event is also sent to the Model Builder 222 in step RD-a.3, triggering it to build a new model for the replacement subscription, and thus the current instance of the Replacement Detector terminates.

When the optional Manual Analysis component 230 is in use, a dynamically configurable Suspect Threshold (defining the second threshold) determines how substantial evidence, i.e. how high a score, is required for involving a human analyst. This threshold should be adjusted based on the availability of experts to further investigate likely replacement subscriptions. Particularly, according to an embodiment the fraudulent subscription detection system 220 is configured to perform (optional) steps S110c, S110d as part of identifying the second fraudulent subscription in step S110, when the highest individual score is not above the first threshold:

S110c: The fraudulent subscription detection system 220 compares the highest individual score to the second threshold. The second threshold is lower than the first threshold.

S110d: The fraudulent subscription detection system 220 obtains, when the highest individual score is higher than the second threshold, manual input from the user interface of the Manual Analysis component 230 for identifying the second fraudulent subscription as one of the subscriptions having their score above the second threshold.

The previously derived MAX_SCORE is compared to the Suspect Threshold in step RD-b.1, and if the threshold is exceeded, the offending subscription is sent for manual analysis via a SIM-box(NEW_SUB) event in step RD-b.2, and the current Replacement Detector instance terminates.

Further aspects of the manual analysis will now be disclosed with parallel reference to the flowchart in FIG. 9. The flowchart in FIG. 9 illustrates the workflow of the Manual Analysis component 230, where each investigation is triggered by the receipt of a SIM-box(SUB) event. The human expert's efforts in determining if the suspected subscription corresponds to a SIM-box subscription are encapsulated in step MA-1. If the verdict is positive, the corroborated SIM-box(SUB) event is forwarded to the Model Builder 221 in step MA-2, and unless the fraudulent subscription detection system 220 operates in inline mode, which is checked in step MA-3, the same event is also sent to the Subscription Manager 290 in step MA-4. In inline mode, the Model Builder 221 will forward the event to the Subscription Manager 290 once the new model is built, and hence the Manual Analysis component 230 is then configured to skip this step.

Figure 10:
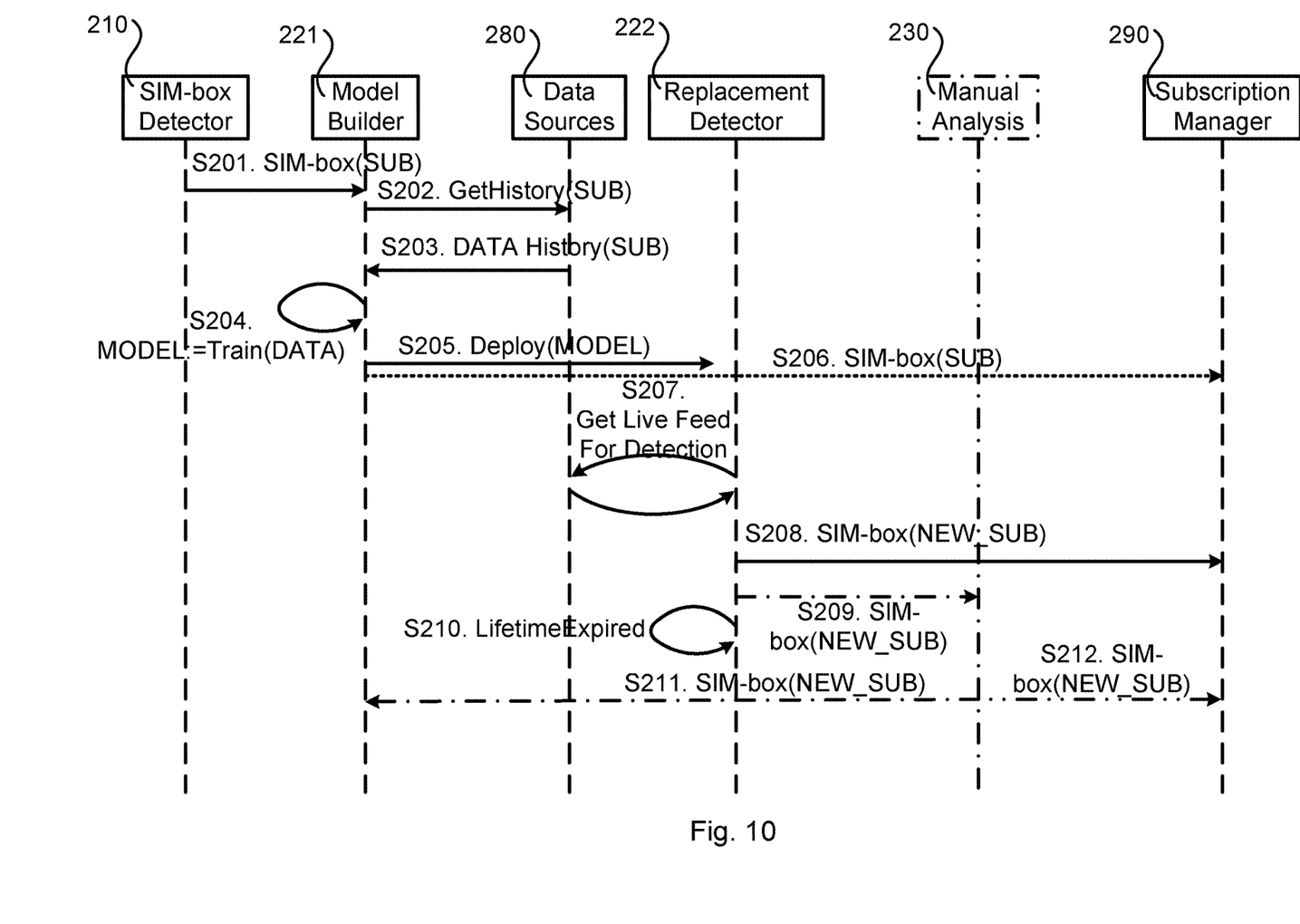
FIG. 10 is a signalling diagram according to an embodiment.

Reference is now made to FIG. 10. FIG. 10 is a signalling diagram for identifying a second fraudulent subscription replacing a first fraudulent subscription as performed by the fraudulent subscription detection system 220 according to a particular embodiment based on at least some of the above disclosed embodiments. In FIG. 10 it is assumed that the Model Builder 221 and the Replacement Detector 222 are part of the fraudulent subscription detection system 220.

Upon receiving a SIM-box(SUB) event from the SIM-box Detector 210 (step S201), a newly spawned Model Builder instance requests recent historical data for the freshly detected SIM-box subscription from the Data Sources 280 using a GetHistory(SUB) event (step S202). Once the relevant DATA is returned (step S203), the Model Builder 221 trains a MODEL for the freshly detected SIM-box subscription (step S204) and instructs the Replacement Detector 222 to deploy that MODEL by sending a Deploy(MODEL) message (step S205). If the fraudulent subscription detection system 220 runs in inline mode, the original SIM-box(SUB) event is now also forwarded to the Subscription Manager 290 (step S206). A newly spawned Replacement Detector instance uses the received MODEL to detect replacement SIM-box subscriptions (i.e. a new fraudulent subscription replacing the freshly detected SIM-box subscription) in a live data feed retrieved from the relevant Data Sources 280 (step S207). If a replacement subscription is identified, the Subscription Manager 290 is notified using a SIM-box (NEW_SUB) event (step S209) and the process is repeated until no further detections are made during the preset lifetime of the instance. The latter is signaled by the internal LifetimeExpired event (step S210).

When the optional Manual Analysis component 230 is in use, the Replacement Detector instances send subscriptions with substantial evidence of being used in SIM-box fraud but not quite sufficient evidence to warrant automated action (i.e., when the above-defined highest individual score is below the above-defined first threshold but above the above-defined second threshold) for Manual Analysis using a SIM-box(NEW_SUB) event (step S209). If human experts determine that such a subscription is indeed implicated in SIM-box fraud, the event is forwarded to the Model Builder component 221 to initiate training and deployment of a detector (step S211). When the fraudulent subscription detection system 220 is deployed in mirror mode, the same event also is sent to the Subscription Manager 290 (step S212).

Figure 11:
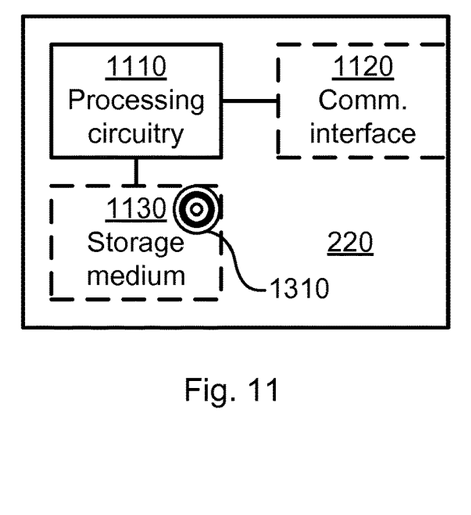
FIG. 11 is a schematic diagram showing functional units of a fraudulent subscription detection system according to an embodiment.

FIG. 11 schematically illustrates, in terms of a number of functional units, the components of a fraudulent subscription detection system 1120 according to an embodiment. Processing circuitry 1110 is provided using any combination of one or more of a suitable central processing unit (CPU), multiprocessor, microcontroller, digital signal processor (DSP), etc., capable of executing software instructions stored in a computer program product 1310 (as in FIG. 13), e.g. in the form of a storage medium 1130. The processing circuitry 1110 may further be provided as at least one application specific integrated circuit (ASIC), or field programmable gate array (FPGA).

Particularly, the processing circuitry 1110 is configured to cause the fraudulent subscription detection system 1120 to perform a set of operations, or steps, as disclosed above with references to FIGS. 5, 7-10. For example, the storage medium 1130 may store the set of operations, and the processing circuitry 1110 may be configured to retrieve the set of operations from the storage medium 1130 to cause the fraudulent subscription detection system 1120 to perform the set of operations. The set of operations may be provided as a set of executable instructions.

Thus the processing circuitry 1110 is thereby arranged to execute methods as herein disclosed. The storage medium 1130 may also comprise persistent storage, which, for example, can be any single one or combination of magnetic memory, optical memory, solid state memory or even remotely mounted memory. The fraudulent subscription detection system 1120 may further comprise a communications interface 1120 at least configured for communications with other systems, functions, nodes, entities, and devices. As such the communications interface 1120 may comprise one or more transmitters and receivers, comprising analogue and digital components. The processing circuitry 1110 controls the general operation of the fraudulent subscription detection system 1120 e.g. by sending data and control signals to the communications interface 1120 and the storage medium 1130, by receiving data and reports from the communications interface 1120, and by retrieving data and instructions from the storage medium 1130. Other components, as well as the related functionality, of the fraudulent subscription detection system 1120 are omitted in order not to obscure the concepts presented herein.

Figure 12:
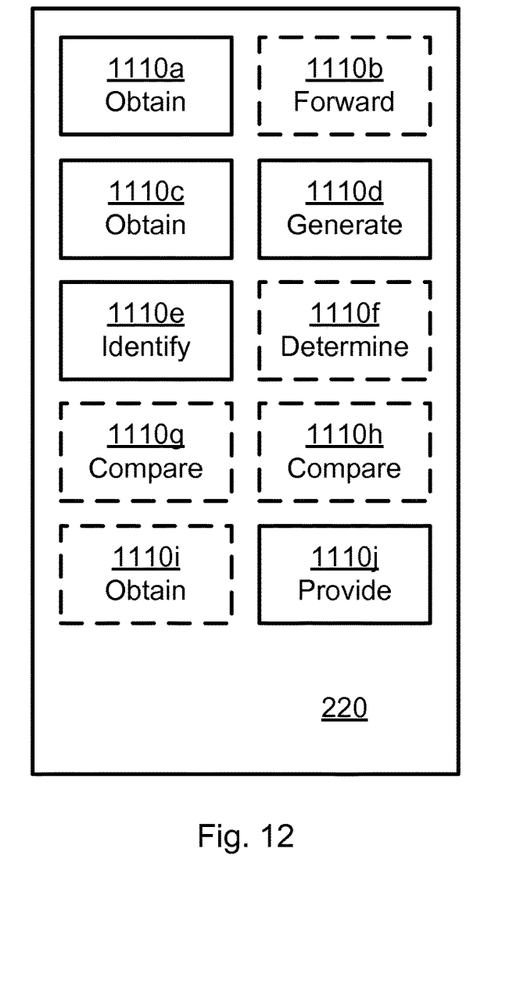
FIG. 12 is a schematic diagram showing functional modules of a fraudulent subscription detection system according to an embodiment.

FIG. 12 schematically illustrates, in terms of a number of functional modules, the components of a fraudulent subscription detection system 1120 according to an embodiment. The fraudulent subscription detection system 1120 of FIG. 12 comprises a number of functional modules; an obtain module moa configured to perform step S102, an obtain module 1110d configured to perform step S106, a generate module mod configured to perform step S108, an identify module 1110e configured to perform step S110, and a provide module 1110j configured to perform step S112.

The fraudulent subscription detection system 1120 of FIG. 12 may further comprise a number of optional functional modules, such as any of a forward module 1110b configured to perform step S104, a determine module 1110f configured to perform step S110a, a compare module 1110g configured to perform step S110b, a compare module mob configured to perform step S110c, and an obtain module 1110i configured to perform step S110d.

In general terms, each functional module 1110a-1110j may in one embodiment be implemented only in hardware and in another embodiment with the help of software, i.e., the latter embodiment having computer program instructions stored on the storage medium 1130 which when run on the processing circuitry makes the fraudulent subscription detection system 1120 perform the corresponding steps mentioned above in conjunction with FIG. 12. It should also be mentioned that even though the modules correspond to parts of a computer program, they do not need to be separate modules therein, but the way in which they are implemented in software is dependent on the programming language used. Preferably, one or more or all functional modules 1110a-1110j may be implemented by the processing circuitry 1110, possibly in cooperation with the communications interface 1120 and/or the storage medium 1130. The processing circuitry 1110 may thus be configured to from the storage medium 1130 fetch instructions as provided by a functional module 1110a-1110j and to execute these instructions, thereby performing any steps as disclosed herein.

The fraudulent subscription detection system 1120 may be provided as a standalone device or as a part of at least one further device. For example, the fraudulent subscription detection system 1120 may be provided in a node of the radio access network or in a node of the core network. Alternatively, functionality of the fraudulent subscription detection system 1120 may be distributed between at least two devices, or nodes. These at least two nodes, or devices, may either be part of the same network part (such as the radio access network or the core network) or may be spread between at least two such network parts. A first portion of the instructions performed by the fraudulent subscription detection system 1120 may be executed in a first device, and a second portion of the of the instructions performed by the fraudulent subscription detection system 1120 may be executed in a second device; the herein disclosed embodiments are not limited to any particular number of devices on which the instructions performed by the fraudulent subscription detection system 1120 may be executed. Hence, the methods according to the herein disclosed embodiments are suitable to be performed by a fraudulent subscription detection system 1120 residing in a cloud computational environment. Therefore, although a single processing circuitry 1110 is illustrated in FIG. 11 the processing circuitry 1110 may be distributed among a plurality of devices, or nodes. The same applies to the functional modules 1110a-1110j of FIG. 12 and the computer program 1320 of FIG. 13 (see below).

Figure 13:
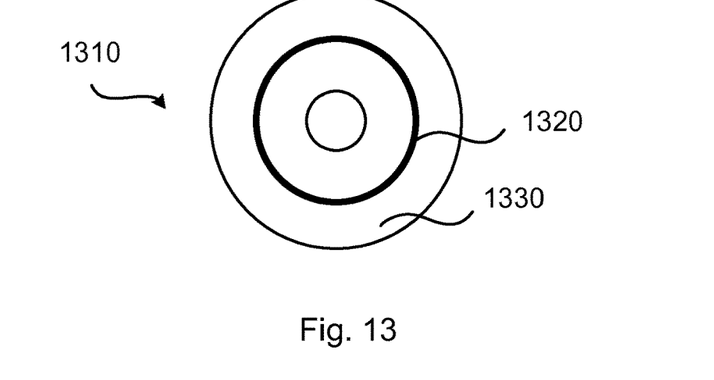
FIG. 13 shows one example of a computer program product comprising computer readable storage medium according to an embodiment.

FIG. 13 shows one example of a computer program product 1310 comprising computer readable storage medium 1330. On this computer readable storage medium 1330, a computer program 1320 can be stored, which computer program 1320 can cause the processing circuitry 1110 and thereto operatively coupled entities and devices, such as the communications interface 1120 and the storage medium 1130, to execute methods according to embodiments described herein. The computer program 1320 and/or computer program product 1310 may thus provide means for performing any steps as herein disclosed.

In the example of FIG. 13, the computer program product 1310 is illustrated as an optical disc, such as a CD (compact disc) or a DVD (digital versatile disc) or a Blu-Ray disc. The computer program product 1310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320 is here schematically shown as a track on the depicted optical disk, the computer program 1320 can be stored in any way which is suitable for the computer program product 1310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for identifying a second fraudulent subscription replacing a first fraudulent subscription, the method being performed by a fraudulent subscription detection system, the method comprising:
obtaining notification of the first fraudulent subscription having been identified in a SIM box;
obtaining historical network data of the first fraudulent subscription;
generating a model based on the historical network data;
identifying the second fraudulent subscription replacing the first fraudulent subscription in the SIM box upon providing live network data as input to the model, identifying the second fraudulent subscription comprising:
generating, using the model, a set of candidate subscriptions;
determining an individual score for each candidate subscription in the set of candidate subscriptions, each individual score being generated from the live network data, each individual score relating to each candidate subscription in the set of candidate subscriptions corresponding to whether the candidate subscription in the set of candidate subscriptions is a fraudulent subscription;
comparing a highest individual score of all of the individual scores relating to each candidate subscription in the set of candidate subscriptions to a first threshold; and
the second fraudulent subscription being identified as a candidate subscription from the set of candidate subscriptions having the highest individual score that is above the first threshold; and
providing an identification of the second fraudulent subscription to at least one of a subscription manager entity and a user interface of a Manual Analysis component.

2. The method according to claim 1, wherein the historical network data is used to generate the model to have characteristics of the first fraudulent subscription.

3. The method according to claim 2, wherein the characteristics pertain to at least one of mobile equipment identifier, subscription identifier, geographical location, and calling pattern of the first fraudulent subscription.

4. The method according to claim 1, wherein identifying the second fraudulent subscription involves comparing feature vectors of any subscriptions generated from the live network data with a feature vector built from the historical network data for the first fraudulent subscription.

5. The method according to claim 4, wherein identifying the second fraudulent subscription involves classifying, according to the comparing, each of the any subscriptions as one of legitimate and fraudulent.

6. The method according to claim 1, wherein, when the highest individual score of all of the individual scores relating to each candidate subscription in the set of candidate subscriptions is not above the first threshold, identifying the second fraudulent subscription further comprises:
comparing the highest individual score relating to each candidate subscription in the set of candidate subscriptions to a second threshold, the second threshold being lower than the first threshold; and
obtaining, when the highest individual score relating to each candidate subscription in the set of candidate subscriptions is higher than the second threshold, manual input from the user interface of the Manual Analysis component for identifying the second fraudulent subscription as one of the subscriptions having its individual score above the second threshold.

7. The method according to claim 1, wherein a first timer is started upon obtaining the notification, and wherein the second fraudulent subscription is identified before expiration of the first timer.

8. The method according to claim 1, wherein a second timer is started upon obtaining the notification, and wherein when the second fraudulent subscription is identified before expiration of the second timer, the model is kept for identifying a third fraudulent subscription replacing the second fraudulent subscription.

9. The method according to claim 1, wherein a second timer is started upon obtaining the notification, and wherein when the second fraudulent subscription is not identified before expiration of the second timer, a new model is generated for identifying a third fraudulent subscription replacing the second fraudulent subscription.

10. The method according to claim 1, wherein the notification is obtained from a SIM box detector.

11. The method according to claim 10, wherein the SIM box detector utilizes at least one of a test call generator service, a fraud management system, and a machine learning, ML, algorithm to identify the first fraudulent subscription.

12. The method according to claim 1, wherein the historical network data represents at least one of a call detail record, a customer relationship management record, and mobile network data of the first fraudulent subscription.

13. The method according to claim 1, wherein a set of subscriptions are generated by the fraudulent subscription detection system, and wherein the live network data represents at least one of a call detail record, a customer relationship management record, and mobile network data of the set of subscriptions.

14. The method according to claim 13, wherein the live network data comprises initial signaling for setting up the set of subscriptions.

15. The method according to claim 1, further comprising:
forwarding the notification of the first fraudulent subscription to the subscription manager entity.

16. A fraudulent subscription detection system for identifying a second fraudulent subscription replacing a first fraudulent subscription, the fraudulent subscription detection system comprising processing circuitry, the processing circuitry being configured to cause the fraudulent subscription detection system to:
obtain notification of the first fraudulent subscription having been identified in a SIM box;
obtain historical network data of the first fraudulent subscription;
generate a model based on the historical network data;
identify the second fraudulent subscription replacing the first fraudulent subscription in the SIM box upon providing live network data as input to the model, identifying the second fraudulent subscription comprising:
  generating, using the model, a set of candidate subscriptions;
  determining an individual score for each candidate subscription in the set of candidate subscriptions, each individual score being generated from the live network data, each individual score relating to each candidate subscription in the set of candidate subscriptions corresponding to whether the candidate subscription in the set of candidate subscriptions is a fraudulent subscription;
  comparing a highest individual score of all of the individual scores relating to each candidate subscription in the set of candidate subscriptions to a first threshold; and
  the second fraudulent subscription being identified as a candidate subscription from the set of candidate subscriptions having the highest individual score that is above the first threshold; and
provide an identification of the second fraudulent subscription to at least one of a subscription manager entity and a user interface of a Manual Analysis component.

* * * * *